United States Patent
Boufflert et al.

(10) Patent No.: US 9,435,373 B2
(45) Date of Patent: Sep. 6, 2016

(54) BEARING WITH DOUBLE PRE-LOADING

(71) Applicant: SNECMA, Paris (FR)

(72) Inventors: Sebastien Boufflert, Louviers (FR);
Philippe Bourdin, Saint-Just (FR);
Alban Lemaitre, Vernon (FR); Fabien
Tessier, Vernon (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 14/780,721

(22) PCT Filed: Mar. 18, 2014

(86) PCT No.: PCT/FR2014/050622
§ 371 (c)(1),
(2) Date: Sep. 28, 2015

(87) PCT Pub. No.: WO2014/154971
PCT Pub. Date: Oct. 2, 2014

(65) Prior Publication Data
US 2016/0040711 A1 Feb. 11, 2016

(30) Foreign Application Priority Data
Mar. 28, 2013 (FR) .................................... 13 52807

(51) Int. Cl.
F16C 33/60 (2006.01)
F16C 25/08 (2006.01)
F16C 19/16 (2006.01)

(52) U.S. Cl.
CPC ........... F16C 25/083 (2013.01); F16C 19/163 (2013.01); F16C 33/60 (2013.01)

(58) Field of Classification Search
CPC ..... F16C 25/083; F16C 19/163; F16C 33/60
See application file for complete search history.

(56) References Cited

U.S. PATENT DOCUMENTS

| 4,913,564 | A | * | 4/1990 | Stephan | F16C 19/16 384/511 |
| 5,316,393 | A | * | 5/1994 | Daugherty | F16C 25/083 384/517 |
| 6,158,896 | A | * | 12/2000 | Zernickel | F16C 33/60 384/506 |
| 6,846,110 | B2 | * | 1/2005 | Lutz | F16C 19/166 384/517 |
| 2009/0311089 | A1 | | 12/2009 | Begin et al. | |

FOREIGN PATENT DOCUMENTS

| DE | 10 2009 036303 | 2/2011 |
| FR | 2 932 530 | 12/2009 |
| JP | 2000 320550 | 11/2000 |
| JP | 2005 201334 | 7/2005 |

OTHER PUBLICATIONS

International Search Report Issued May 8, 2014 in PCT/FR2014/050622 filed Mar. 18, 2014.

* cited by examiner

Primary Examiner — Thomas R. Hannon
(74) Attorney, Agent, or Firm — Oblon, McClelland, Maier & Neustadt, L.L.P.

(57) ABSTRACT

In a rotary machine bearing including an inner ring, an outer ring, and rolling elements between them, one of the inner and outer rings includes first and second half-rings suitable for being clamped in the axial direction between a thrust member and a first pre-loading system exerting a first predetermined axial force, and a second pre-loading system is provided that is inserted in the axial direction between the first and second half-rings and that exerts a second predetermined axial force less than the first predetermined axial force.

9 Claims, 1 Drawing Sheet

BEARING WITH DOUBLE PRE-LOADING

FIELD OF THE INVENTION

The present invention relates to a bearing that also acts as an axial thrust bearing for a rotary machine, the bearing having an inner ring arranged around a shaft, an outer ring arranged in a casing, and rolling elements between the rings.

PRIOR ART

In the context of cryogenic rotary machines mounted on radial fluid bearings, where one of the major advantages of such machines is long lifetime in comparison with machines mounted on conventional ball or roller bearings that are confronted with problems of wear because of the impossibility of providing the necessary lubrication under cryogenic conditions, axial thrust bearings are known for the purpose of taking up residual axial forces. The architecture mounted on fluid bearings requires an element for the purpose of taking up residual axial forces, in particular during a transient stage (at low speed) for machines having an active axial balancing system under steady conditions, as described in application FR 2 932 530 in the name of the Applicant.

That prior art axial thrust bearing nevertheless presents certain drawbacks as a result in particular of the need to manage the clearance that is necessary to enable the rotor shaft to slide axially on passing from low speeds to high speeds. In addition, because the bearing operates using three or four points of contact, transitions between loading directions are performed poorly.

OBJECT AND DEFINITION OF THE INVENTION

The present invention seeks to remedy the above-mentioned drawbacks by proposing a bearing for a rotary machine, the bearing comprising an inner ring, an outer ring, and rolling elements between them, the bearing being characterized in that one of said inner and outer rings comprises first and second half-rings capable of being clamped in the axial direction between firstly a thrust member and secondly a first pre-loading system exerting a first predetermined axial force, and in that said bearing also includes a second pre-loading system inserted in the axial direction between said first and second half-rings and exerting a second predetermined axial force less than said first predetermined axial force.

Adding first and second pre-loading systems facilitates operation with two points of contact when the bearing is brought into play. By spacing apart the two half-rings, this system serves to avoid long periods of operation using three points of contact, which can degrade the bearing, while also making the bearing easier to design in spite of the addition of a new part.

The rotary bearing and bidirectional axial thrust bearing function performed by the invention while favoring a preferred direction of operation (force towards the first pre-loading system) also presents the major advantage of being capable of managing the large amount of clearance (up to several millimeters) that makes axial sliding possible, and thus of making it easier to bring into operation an active type axial balancing system (nozzle on the bladed wheel or impeller, for example), without having recourse to a conventional pair of bearings.

Depending on the intended embodiment, said first and second half-rings may constitute said outer ring, in which case they are designed to be mounted slidably in a stationary casing, with the thrust member forming a portion of said stationary casing, or else they may constitute said inner ring, in which case they are slidably mounted around a stationary shaft, the thrust member then forming a portion of said stationary shaft.

Preferably, the first and second pre-loading systems comprise respective resilient assemblies advantageously made up of one or more spring washers.

The axial thrust bearing of the invention is advantageously applied to a cryogenic rotary machine.

BRIEF DESCRIPTION OF THE DRAWINGS

Other characteristics and advantages of the invention appear from the following description of particular embodiments given as examples with reference to the accompanying drawings, in which.

DETAILED DESCRIPTION OF PREFERRED EMBODIMENTS

Figure 1:
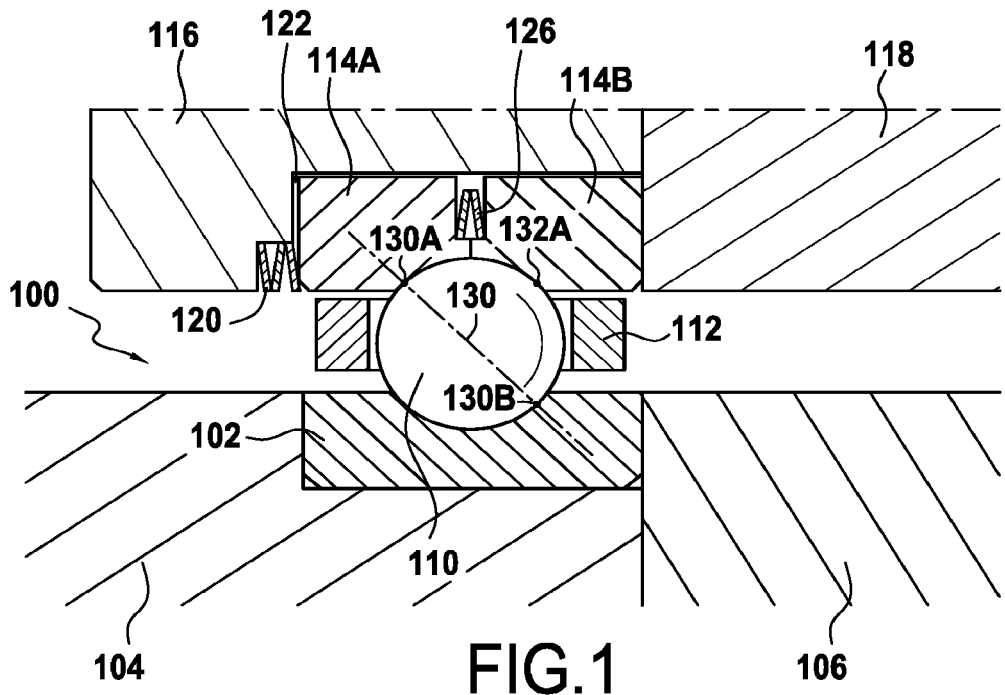
FIG. 1 is an axial half-section view of an embodiment of a bearing of the invention (in its rest position)

FIG. 1 shows an example of a rotary bearing of the invention that also forms an axial thrust bearing function. The bearing 100 comprises an inner ring 102 mounted radially on a central shaft 104, 106 which may, for example, be secured to an impeller of a cryogenic rotary machine. The inner ring 102 is driven in rotation by the central shaft, which is advantageously mounted on conventional bearings of the fluid type, of the leaf type, of the magnetic type, or of other type, that are not shown in the drawing, and the rotary machine may advantageously be provided with an active system for axial balancing under steady conditions (although a passive system is also suitable), such as the system described in the application mentioned in the introduction.

The axial thrust bearing has rolling elements 110, such as oblique-contact balls, that are held in a cage 112 and arranged between the inner ring 102 and an outer ring 114 made up of two portions 114A and 114B that are centered in a stationary casing 116 in which they are free to slide in the axial direction during certain stages of operation.

The outer half-rings 114A and 114B are clamped in the axial direction between firstly a portion of the casing or a stationary thrust member 118 secured to the casing 116, and secondly a first pre-loading system 120 formed by a resilient assembly, e.g. one or more spring washers, exerting a first predetermined axial force, e.g. of the order of several hundreds of newtons, such that, so long as the axial load exerted by the rotary shaft is zero or less than a given threshold (e.g. likewise of the order of several hundreds of newtons), which threshold depends on the speed of rotation, clearance 122 is created having a width of a few hundredths of a millimeter to several millimeters between the outer half-ring 114A and the casing 116 (located beside the first pre-loading system 120), the outer half-rings 114A, 114B themselves being spaced apart by a gap 124 (shown in FIG. 2) that may be opened to several millimeters in operation by a second pre-loading system 126 arranged between the outer half-rings and likewise formed by a resilient assembly, e.g. made up of one or more spring washers that exert a second predetermined axial force, e.g. of the order of several tens of newtons, that is less than the first predetermined axial force. These spring washers may advantageously be held in position by an annular clip (not shown) taking up position in respective associated grooves in each of the outer half-rings.

Figure 2:
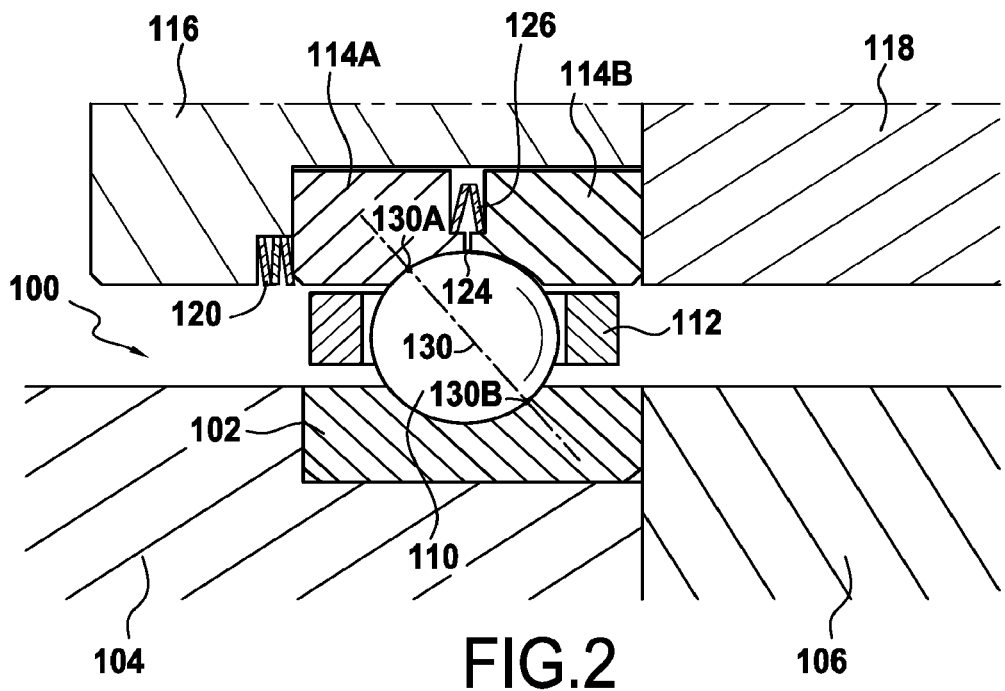
FIG. 2 is an axial half-section view of the FIG. 1 bearing in operation.

The operation of the bearing in accordance with the invention is described below by comparing FIGS. 1 and 2.

A first stage is considered to be the stage during which the bearing is driven in rotation by the rotary shaft while the shaft is exerting little or no axial force on the bearing in the direction opposite to the force exerted by the pre-loading system 120. During this stage, so long as this axial force is less than a threshold value, given that the first predetermined axial force of the first pre-loading system 120 is greater than the force exerted by the second pre-loading system 126, the clearance 122 is open and the bearing operates under potentially usable transitional conditions (potentially having three points of contact 130A, 130B, 132A, balls sliding, . . . ). This first stage of operation is nevertheless minimized by introducing the second pre-loading system 126 within the bearing, thus enabling the gap 124 to be opened and increased in width as the axial force increases.

The ball bearing takes up the axial thrust, its speed changes, and once the axial force exerted by the shaft is greater than this threshold value, the outer half-ring 114A slides in the casing 116 and the clearance 122 closes in a second stage of operation. The second predetermined axial force exerted by the second pre-loading system 126 then widens the gap 124 by moving the outer half-ring 114A (together with the balls that are then released from the third point of contact 132A) away from the outer half-ring 114B, which half-ring remains pressed against its stationary thrust member 118 secured to the casing. The value is at a maximum when the clearance 122 is zero. The bearing then operates via two points of contact 130A and 130B. The advantage of operating in this way is to minimize dissipated power and wear while operating as a conventional ball bearing. It is capable of withstanding significant levels of axial force. In addition, this type of bearing permits the shaft to slide by a large amount (several millimeters) in the casing, which is not possible with a conventional bearing. Since the other outer half-ring 114B is held pressed against the stationary thrust member 118, the clearance between the balls and this outer half-ring is selected in such a manner as to ensure that the outer half-ring 114B does not disturb the operation of the bearing with two points of contact. This clearance is directly associated with the clearance 122, which can be adjusted during assembly.

The third stage is constituted by the stage that could be referred to as "off-loading", in which the axial force exerted by the shaft on the bearing, still towards the thrust member, drops, and as a result of the active system for axial balancing coming into operation it becomes zero. As soon as its value becomes less than the threshold value, the clearance 122 opens once more and the outer half-ring 114A slides together with the balls towards the outer half-ring 114B, thereby potentially recreating contact 132A between the balls and the outer half-ring 114B, as would happen in a conventional bearing having three points of contact. As explained above, the bearing then operates under potentially unstable transitional conditions (balls sliding, . . . ) that need to be minimized. The bearing continues to be driven in rotation by the shaft and it is subjected both to the force exerted by the shaft and to the internal force including the force exerted by the second pre-loading system 126, potentially leading to the point of contact 132A.

Finally, once the force exerted by the shaft is zero and then reversed so as to become negative, the bearing continues to be driven, but now via the contact 132A. By then coming into abutment in the opposite direction, it nevertheless continues to function potentially on three points of contact (like a conventional bearing having three points).

With the invention, by introducing secondary pre-loading internally in the bearing (spring washer 126 located between the two outer half-rings 114A and 114B), there is no need to provide thermomechanical control over the gap and the clearances within the outer ring. Thus, when the bearing is subjected to the axial force of the shaft and operates via two points of contact 130A, 130B, this secondary internal pre-loading serves to offset axially the outer half-ring 114B that is not involved in the operation of the bearing during this stage. This secondary pre-loading also makes it possible to increase and to provide better control over the clearance between the balls 110 and the half-ring 114B that is potentially troublesome for the operation of the bearing.

It should be observed that although the invention is described with a bearing in which the outer ring slides in the stationary casing, with the inner bearing being stationary on the rotary shaft, it is clear that, in the same manner as in the application mentioned in the introduction, the invention is also applicable to a bearing in which the inner ring slides on the shaft, which is now stationary, with the outer ring being in a rotary casing.

The invention claimed is:

1. A bearing for a rotary machine, the bearing comprising:
an inner ring,
an outer ring,
rolling elements between said inner and outer ring, a first pre-loading system exerting a first predetermined axial force, one of said inner and outer rings comprising first and second half-rings capable of being clamped in the axial direction between a thrust member and said first pre-loading system, and
a second pre-loading system inserted in the axial direction between said first and second half-rings and exerting a second predetermined axial force less than said first predetermined axial force.

2. A bearing according to claim 1, wherein said first and second half-rings constitute said outer ring and are for mounting slidably in a stationary casing.

3. A bearing according to claim 2, wherein said stationary casing comprises a portion forming the thrust member.

4. A bearing according to claim 1, wherein said first and second half-rings constitute said inner ring and are designed to be slidably mounted around a stationary shaft.

5. A bearing according to claim 4, wherein said stationary shaft comprises a portion forming the thrust member.

6. A bearing according to claim 1, wherein the first and second pre-loading systems comprise respective resilient assemblies.

7. A bearing according to claim 6, wherein each said resilient assembly comprises one or more spring washers.

8. A bearing according to claim 1, wherein said rolling elements are oblique-contact bearing balls.

9. A bearing according to claim 1, applied to an axial thrust bearing of a rotary machine mounted on radial fluid bearings.

* * * * *